United States Patent [19]
Rosh

[11] 4,395,380
[45] Jul. 26, 1983

[54] METHOD OF TESTING FLUID FLOW CONDITION IN EXTENSION OF A PIPE

[76] Inventor: Donald M. Rosh, 83 Orchrd Rd., Briarcliff Manor, N.Y. 10510

[21] Appl. No.: 262,623

[22] Filed: May 11, 1981

Related U.S. Application Data

[63] Continuation of Ser. No. 29,648, Apr. 13, 1979, abandoned.

[51] Int. Cl.³ .................................................. G21C 17/00
[52] U.S. Cl. ........................................ 376/247; 374/54; 374/124
[58] Field of Search ............... 73/15 R; 376/245, 247, 376/256

[56] References Cited
U.S. PATENT DOCUMENTS 4,067,771  1/1978  Rubin ................................. 376/247

*Primary Examiner*—Sal Cangialosi
*Attorney, Agent, or Firm*—Brooks, Haidt, Haffner & Delahunty

[57] ABSTRACT

A method for the remote testing of spray nozzles on headers in a nuclear reactor containment building to determine whether the nozzles are open or blocked. Heated air under pressure is supplied to the headers, and an open nozzle reaches a higher temperature than a blocked nozzle. The headers and nozzles are scanned by an infrared camera having a thermogram display, and open nozzles appear in the thermogram as extending from the headers whereas blocked nozzles appear as minor protrusions on the headers. The camera is mounted on a polar crane within the building, the crane having an axis of rotation which coincides with the axes of the headers and the camera being displaced from the crane axis, and the crane is rotated around its axis during the scanning of the headers and nozzles by the camera.

6 Claims, 8 Drawing Figures

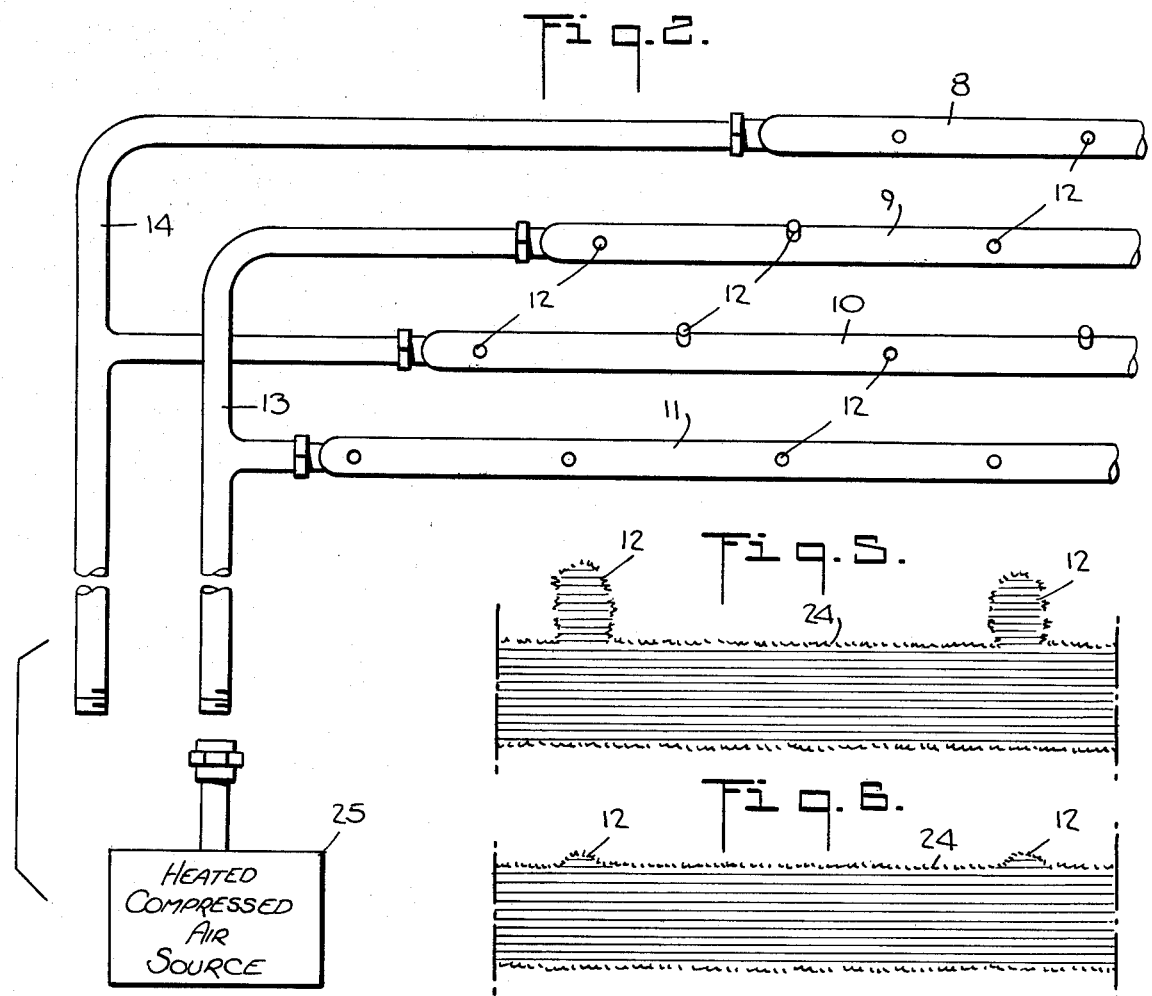
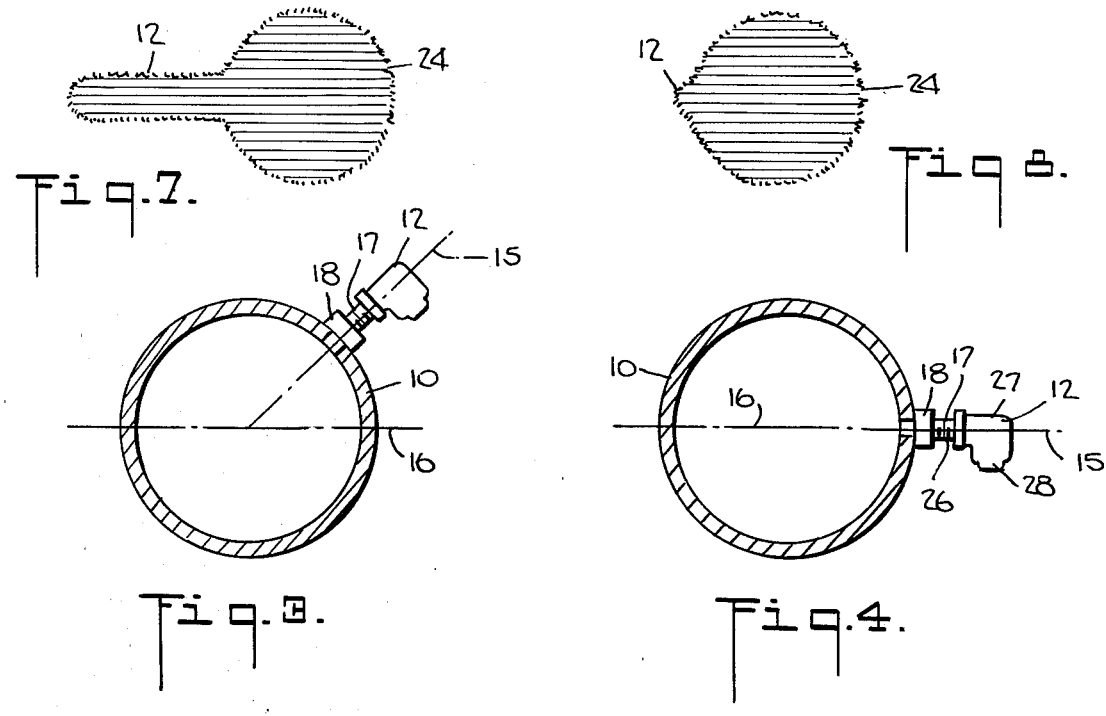

METHOD OF TESTING FLUID FLOW CONDITION IN EXTENSION OF A PIPE

This is a continuation of application Ser. No. 29,648, filed Apr. 13, 1979, now abandoned.

The invention relates to the remote examination of pipes having communicating tubular extensions to determine whether or not such extensions are obstructed and relates particularly to the testing, at various times and from a remote position, of the flow through nozzles extending from headers in a cooling water spray system.

In nuclear power plants, there is a containment building overlying the reactor. The building is circular and dome-like, and within the dome, there are a plurality of ring-shaped headers from which a plurality of nozzles extend. In the event of an accident, e.g. loss of reactor coolant circulation, a flow of water is automatically supplied through risers to the normally dry headers to spray from the nozzles to cool the interior of the building. Regulatory agencies usually require that the cooling spray headers and nozzles be tested every three years to demonstrate that they are not obstructed to an extent that the spray system is inadequate.

The interior of the dome of the building may be as high as 140 feet above the floor of the building and the headers are near the dome. Although the building may also include a polar crane which is rotatable and which has a catwalk above the floor, the headers may be fifty feet or more above such catwalk. Therefore, the headers and nozzles are relatively inaccessible, and it is relatively time consuming and expensive to erect structures, such as scaffolding, to permit close examination of the nozzles.

In addition, the headers and nozzles are usually made of stainless steel and great care must be taken to prevent exposing them to corrosive materials, such as small parts per million of halogens or compounds thereof, and therefore testing techniques as would involve such exposure must be avoided.

Normally, the testing of the headers and nozzles is conducted while the reactor is shut down, and because the reactor shutdown time should be as short as possible, and because other tests may also be necessary during such shutdown time, it is necessary to conduct the header and nozzle testing within a short period of time.

Usually, the spray system involves a large number, e.g. over 250, nozzles, and therefore, a system of testing is required which will permit the testing of each individual nozzle relatively rapidly. In those cases where the headers are only 15–30 feet from a platform or catwalk, it has been possible to supply air under pressure to the headers and check the air flow from each nozzle with a streamer on a long pole. However, even this technique can require three days of two shifts per day to complete the necessary testing. In other cases, where the headers are farther away from a platform or support, it had been proposed to test the outflow of air from the nozzles by means of a streamer supported by a tethered, helium-filled balloon, but this is time consuming and difficult to accomplish.

Consideration has been given to supplying smoke or visible steam to the headers, and to then visually observe the issuance thereof from the nozzles. This is also impractical not only because the smoke or steam issuing from the nozzles obscures them making it difficult to ascertain that each nozzle is properly functioning, but also because such may include undesirable corrosive materials.

I have discovered from tests that when heated air is forced through such headers and nozzles there is an unexpected effect, namely, a blocked nozzle does not reach a temperature as high as a nozzle through which the air flows freely. It is possible, therefore, to distinguish a blocked nozzle from an open nozzle on the basis of temperature. The explanation for this effect is not entirely clear because it would be expected that the temperature along the length of a nozzle would be substantially the same, and would be substantially the same as the temperature of the header to which it is attached due to the conductivity of the metal. However, it has been found that the temperature of an open nozzle, along its length, is many degrees higher than the temperature along the length of a blocked nozzle even though the temperature of both an open nozzle and a blocked nozzle a short distance from the header to which it is attached is less than the temperature of the header when heated air under pressure is supplied to the header.

While there are various ways to measure remotely the temperatures of the nozzles, e.g. thermocouples, it is undesirable to make permanent installations requiring wires, etc., for remote observation, and it would be expensive and time-consuming to install such in already existing installations. I have further discovered that, considering both the distances involved and the nozzle temperature differences involved, infrared scanning techniques and apparatus, as developed today, are adequate to permit distinguishing between the temperature of a blocked nozzle and the temperature of an open nozzle with such apparatus located on a platform or catwalk normally located below the headers, at distances of up to 100 feet or more therefrom. Thus, by successively scanning the nozzles from a remote point while heated air is supplied to the headers under pressure, the location of any blocked nozzle or nozzles can be determined.

One object of the invention is to provide a method of remote testing of the fluid flow through nozzles, which does not require any physical contact or interconnections with the nozzles.

Another object of the invention is to provide a method of remote testing of the fluid flow through nozzles, which can be performed easily and in a relatively short time even though many nozzles are involved.

In the preferred embodiment of the invention, clean air under pressure, e.g. at 100 lbs. p.s.i., and at a temperature substantially above ambient temperature, e.g. at a temperature of at least 100° F., is supplied to a header having nozzles secured thereto, and the header and each nozzle is scanned with infrared scanning apparatus to provide thermograms thereof which are observed to determine whether or not the thermogram of each nozzle conforms to the thermogram of an open or a blocked nozzle. If desired a plurality of nozzles may be scanned simultaneously so that a plurality thereof appear in the same thermogram.

Other objects and advantages of the present invention will be apparent from the following detailed description of the presently preferred embodiments thereof, which description should be considered in conjunction with the accompanying drawings in which:

FIG. 2 is a modified, enlarged, fragmentary elevation view of the headers and supply risers shown in FIG. 1, and also shows a source of heated compressed air;

Figure 1:
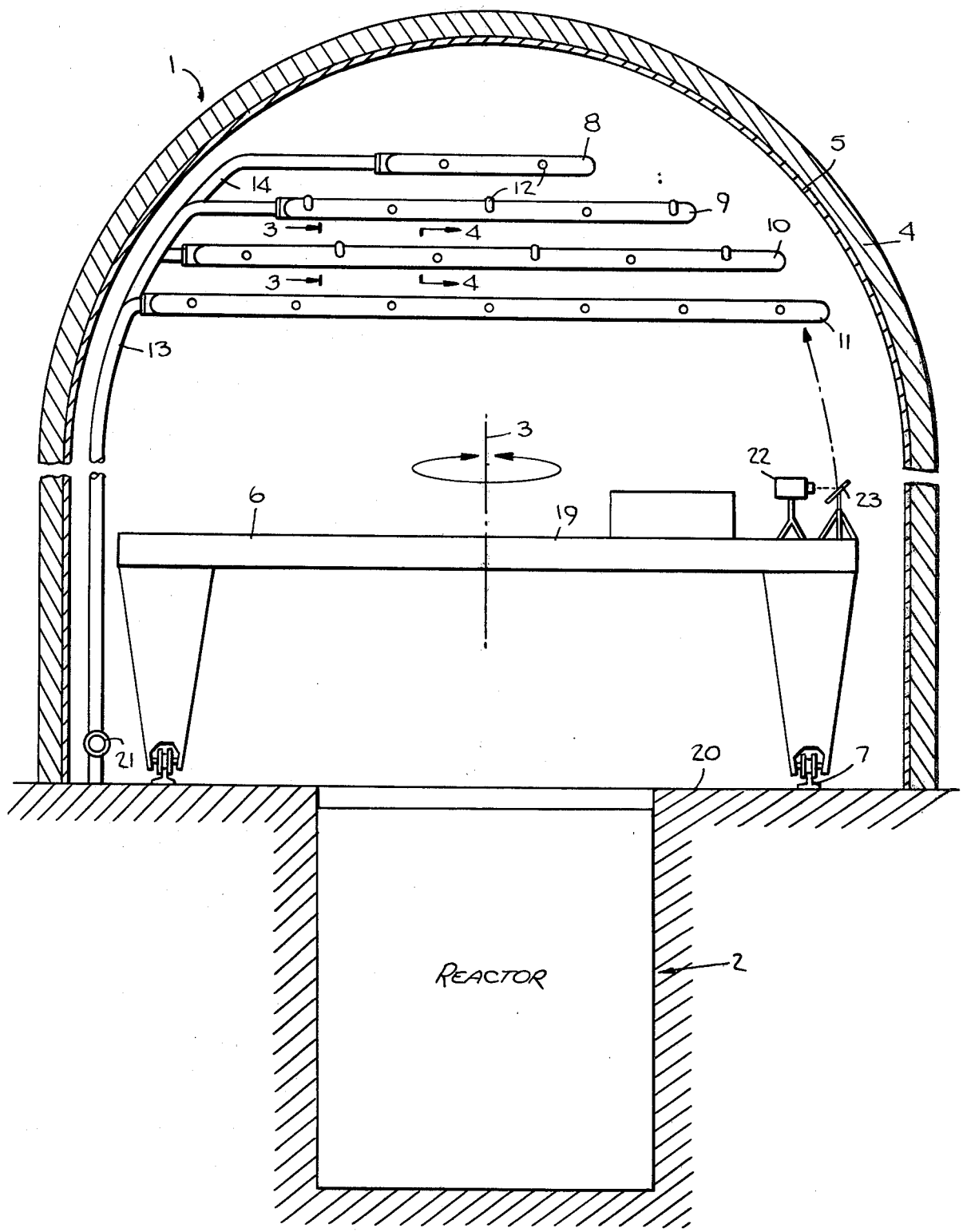
FIG. 1 is a diagramatic, elevation view, partly in section, of one type of containment building which is associated with a nuclear reactor and in which coolant spray headers are located.

FIGS. 3 and 4 are enlarged, cross-sectional views of a header showing spray nozzles extending therefrom, and are respectively taken along the lines 3—3 and 4—4 indicated in FIG. 1;

FIGS. 5 and 6 illustrate, respectively, side elevation thermograms of a header with two open nozzles and a header with two blocked nozzles; and FIGS. 7 and 8 illustrate, respectively, end elevation thermograms of a header with an open nozzle and a header with a blocked nozzle.

FIG. 1 illustrates diagramatically a type of nuclear reactor installation for generating electric power which includes a containment building 1 above a reactor 2 illustrated by a rectangle in FIG. 1. The building 1 is circular at its base around a vertical axis 3 and has a hemispherical dome. The exterior portion 4 of the building 3 usually is made of reinforced concrete which is interiorly lined with steel sheet 5. A polar crane 6 supported by a rail 7, in circular form, is rotatable around the axis 3. Above the crane 6 is a plurality of headers 8-11, being respective pipes formed into rings, each having a plurality of stainless steel spray nozzles 12 extending therefrom. When the situation requires it, cooling water is supplied to the headers 8-11 through risers 13 and 14, and the water flows out of the nozzles 12. However, normally, the risers 13 and 14 and the headers 8-11 do not contain any liquid.

The nozzles 12 may extend at various angles from the headers 8-11, but usually, the axes of some of the nozzles 12 are horizontal and the axes of other nozzles 12 extend at an angle of 45° to the plane of the associated header. Thus, FIG. 3 shows a nozzle 12 having its axis 15 at 45° to the plane 16 of the header 10, and FIG. 4 shows a nozzle 12 having its axis 15 parallel to the plane 16 or horizontal. The nozzles 12 may, for example, be nozzles of the type sold by Spray Engineering Company of Burlington, Mass., under the model number 1713A and are each attached to the headers by one inch nipples 17 threaded into the nozzles 12 and into bosses 18 in the headers. Thus, the radially outermost surfaces of the nozzles 12 are about six inches from the outer periphery of the headers. The external diameter of the header pipes may be about eight inches, and the ring diameters of the headers may be about fourteen feet for the header 8 and about 119 feet for the header 11, the headers 9 and 10 having intermediate sized ring diameters as indicated in FIG. 1. The nozzles 12 may be spaced apart by a distance in the range from about one and three-quarters feet to about five feet, and the vertical spacing between the headers may be on the order of five feet.

The upper surface, or a catwalk surface 19 of the crane 6 may be sixty-two feet from the floor 20 of the building 1, and the spacing between the surface 19 and the lowermost header 11 may vary between fifteen and sixty feet depending on the installation. It is apparent, therefore, that it is difficult to visually observe or reach each nozzle 12 from the surface 19 and, as previously indicated, it usually is necessary to determine periodically whether or not the nozzles 12 are open, i.e. to permit free flow of a coolant spray therethrough.

To determine the effects of a supply of heated air to headers with nozzles 12, a series of temperature measurements were made on a pipe 24 (FIGS. 5-8) with nozzles 12 thereon while heated air under pressure was supplied to the pipe 24. The heated air was supplied to the pipe 24 by a hair dryer rated to supply 40 c.f.m. of air at 300°-400° F., and the air temperature in the pipe 24 varied with time. Thermocouples were attached to points corresponding to the points 26, 27 and 28 (FIG. 4) and the following results were obtained on one of the nozzles, the results for other nozzles being similar:

| Nozzle Condition | Time Min. | Header Temp. °F. | Temperature °F. | | |
|---|---|---|---|---|---|
| | | | At 26 | At 27 | At 28 |
| Plugged | 0 | 74 | 77 | 78 | 80 |
| Plugged | 3 | 156 | — | — | — |
| Plugged | 5 | 172 | — | — | — |
| Plugged | 9 | 182 | — | 82 | — |
| Plugged | 17 | 193 | 109 | 89 | 84 |
| Plugged | 30 | 201 | 118 | 97 | 84 |
| Plugged | 45 | 208 | 129 | 105 | 84 |
| Open | 0 | 73 | 75 | 74 | 79 |
| Open | 12 | 167 | 119 | 122 | 153 |
| Open | 30 | 186 | 151 | 153 | 173 |

As will be seen from the foregoing data the temperature of the nozzle 12 immediately adjacent the pipe 24, after a period of a few minutes, is many degrees lower than the temperature of the adjacent header whether the nozzle 12 is plugged or open, and after the same period of time, the temperature of the plugged nozzle at such position 26 is several degrees lower than the temperature of the open nozzle at such position 26. At positions 27 and 28, the temperature of a plugged nozzle 12 is less than the temperature at position 26 thereon, and is always substantially less than the temperature at the positions 27 and 28 on an open nozzle 12. It has been found that available infrared camera equipment can distinguish between radiating body temperatures as small as one-half degree F., and such equipment can readily distinguish between a plugged nozzle 12 and an open nozzle 12, or even between a restricted nozzle 12 and an open nozzle 12, at distances between the infrared camera 22 and the nozzles 12 of one hundred feet or more, provided that the nozzles 12 are far enough apart to permit the camera 22 to separate the images of the nozzles in the thermogram, e.g. twenty inches or more with the camera 22 which was used.

As is known, an infrared camera provides a two dimensional thermogram, such as on a cathode ray tube, which may be photographed, and the thermogram does not show flowing, heated gases. From experiments which I have conducted, I have found that the thermogram of a blocked nozzle 12 differs significantly from the thermogram of a nozzle 12 which is not blocked. Thus, FIG. 5 represents a side view thermogram of a pipe 24 having secured thereto a pair of nozzles 12 which are not blocked when heated air under pressure is supplied to the pipe 24, and FIG. 6 represents the thermogram of the same pipe 24 and nozzles 12 under the same conditions but with the nozzles 12 completely blocked. FIGS. 7 and 8 represent, respectively, thermograms of the nozzles 12 unblocked and blocked and under the same conditions, the thermograms in FIGS. 7 and 8 being taken from along the axis of the pipe 24. By comparing the thermograms, it can be seen readily that when a nozzle 12 is open or unobstructed, it clearly appears as a projection on the pipe 24 and that when a nozzle 12 is blocked, it appears only as a small protrusion at the periphery of the pipe 24. Thermograms of headers 8–11 and nozzles 12 made with the method of the invention in an installation of the type illustrated in FIG. 1 and heretofore described are very similar to those illustrated in FIGS. 5 and 6.

In the experiments which I have conducted, I have used a model 750 infrared camera system manufactured by AGA Infrared Systems AB of Lidingo, Sweden because of its sensitivity and narrow field of view, but other known types of cameras may be used as the camera 22. Various types of infrared cameras and their operation are described at pages 89–92 of the October, 1977 issue of the magazine entitled "Power", published by McGraw-Hill Publishing Co., New York, N.Y. and performance and operation information relating to such cameras is readily available from the manufacturers of such cameras.

In accordance with the testing method of the invention, the risers 13 and 14 are disconnected from the water source, such as at the point 21 (FIG. 1). Each is then successively connected to a source 25 of heated gas under pressure (FIG. 2), and the headers 8–11 and the nozzles 12 are scanned with an infrared camera 22 containing an infrared detector, the camera being mounted on the surface 19. While the camera scanning is in process, the crane 6 is rotated at a slow rate, e.g. one revolution in about twenty-one minutes around the building axes 3 which corresponds with the axis of the ring shaped headers 8–11, so that during one revolution of the crane 6 each nozzle 12 (except possibly the nozzles 12 on the header 8) is examined with the camera 22 from its position shown in FIG. 1. The proper position for the camera 22 on the surface 19 depends upon the relative positions of the headers 8–11, but the position of the camera 22 is selected so that each nozzle 12 can be observed by the camera 22. It has been found, for example, that the camera 22 may be located near the circumference of the surface 19 to observe the nozzles 12 on the headers 9, 10 and 11 and should be moved inward from the circumference to another location on the surface 19 to examine the header 8.

The model 750 infrared camera system of AGA Infrared Systems AB has a 100 mm. lens, a 7° by 7° field of view, and uses liquid nitrogen to cool the infrared detector. Because of the use of liquid nitrogen, the camera cannot be directed at an angle greater than 45° to the horizontal. Accordingly, when observing the headers 9, 10 and 11 and the nozzles 12 thereon, I have used a mirror 23 at which the camera, in a horizontal position, is directed, and the angle of the mirror 23 is selected so as to observe the headers 9, 10 and 11 and the nozzles 12 thereon. However, when observing the nozzles 12 on the header 8, it is possible to direct the camera at the header 8 without interfering with the detector cooling, and therefore, the mirror 23 may be omitted when there is adequate space and the camera can be tilted sufficiently to permit the desired observations.

For calibration or comparison purposes, one or more headers 8–11 may be equipped, when they are installed, with a plugged nozzle at a known position, but this is not essential.

The heated gas which is supplied to the headers 8–11 may be any non-corrosive gas which can be heated to the desired temperature and which will not create undesirable conditions within the building 1. The preferred gas is clean, heated air, and in the successful tests which I have performed in an installation of the type shown in FIG. 1, I used, as the source 25, an oil-free compressor manufactured by Atlas-Copco, Wayne, New Jersey, with the air cooling, heat exchanger removed. The pressure of the air at the outlet of the compressor was 100 p.s.i. and the temperature thereof was between 250° F. and 280° F. The temperature of the air in the risers 13 and 14 was about 145°–150° F. While the air temperature need not be so high, it should be high enough so that the temperature of a nozzle 12 becomes at least one-half degree F. above the ambient temperature which I have found my testing technique to be sensitive enough to detect. Preferably, the temperature of the air issuing from the nozzles 12 is a few degrees, e.g. 5° F., above the ambient temperature and most preferably, the temperature of such air is at least 100° F. and not greater than 200° F. Since the camera also views the background for the headers 8–11, which background includes the dome of the building 1 and the lining 5, the ambient includes such background and must be taken into account.

While the invention has been described in connection with the remote testing of spray nozzles on headers, it will be apparent that the invention may also be used to remotely test the flow through any tubular extension of a pipe or tube to which a heated fluid under pressure can be supplied. While a heated gas is preferred when installations like the spray system described are tested, it will be apparent that a fluid other than a gas may be used if outflow of the fluid from the tubular extension is permissible or tolerable.

In the embodiment of the invention illustrated in FIG. 1, there is a polar crane 6 within the containment building, and the camera 22 is mounted thereon. In some installations a crane 6 may not be present, and there may be a catwalk around the interior of the building which is above the floor 20. In such installations, the camera 22 may be mounted on the catwalk or on the floor 20 and may be moved in any desired manner so as to provide the desired thermograms. In other words, the camera 22 may be located in any convenient position or positions which will permit observation of the nozzles 12.

Although preferred embodiments of the present invention have been described and illustrated, it will be apparent to those skilled in the art that various modifications may be made without departing from the principles of the invention.

I claim:

1. A method for remotely testing the fluid flow condition in a tubular extension of a pipe, the interior of said extension communicating with the interior of said pipe, said method comprising:

supplying a fluid under a pressure above atmospheric pressure and at a temperature at least 5° F. above the temperature of the ambient to the interior of said pipe, whereby said fluid flows out of said extension if it is unblocked, and continuing the supply of said fluid to the interior of said pipe for a time sufficient to raise the temperature of said pipe and an unblocked extension to a temperature at least one-half degree F. above the ambient temperature and above the temperature thereof prior to the supply of said fluid thereto; and scanning said pipe and said extension with an infrared detector from a point remote from said pipe and said extension to obtain a thermogram of the pipe and the extension, an unblocked extension appearing as an image of the extension and a blocked extension not providing a significant image, whereby the fluid-flow condition of the extension is indicated by the image of the extension on the thermogram.

2. A method as set forth in claim 1 wherein said fluid is air.

3. A method as set forth in claim 2 wherein the temperature of the fluid supplied to said pipe is selected to provide a temperature of the fluid at said extension which is at least 100° F.

4. A method as set forth in claim 1 wherein said pipe is ring shaped and has a plurality of said extensions spaced from each other thereon in the form of spray nozzles, and wherein said method further comprising moving said infrared detector about the axis of the ring-shaped pipe as said pipe and the extensions are scanned.

5. A method for remotely testing the fluid flow condition of a plurality of metal spray nozzles mounted in spaced relation on a ring-shaped, metal header within the containment building for a nuclear reactor, said nozzles having fluid communication with said header and extending outwardly from said header for delivering fluid supplied to the header to the interior of said building, said method comprising:

supplying air under a pressure above atmospheric pressure to said nozzles by way of said header, said air having a temperature such that the temperature of the air passing through the nozzles is in the range from 5° F. above the temperature of the ambient for the nozzles to 200° F., and continuing the supply of said air to said nozzles for a time sufficient to raise the temperature of an unblocked nozzle to a temperature at least one-half degree F. above the ambient temperature and above the temperature thereof prior to the supply of air thereto; and scanning said header and said nozzles while said air is supplied thereto with an infrared camera located remotely from the header and having a thermogram display to obtain a thermogram of the header and each nozzle, an unblocked nozzle appearing as an image of the nozzle and a blocked nozzle not providing a significant image, whereby the fluid-flow condition of the nozzle is indicated by the image of the extension on the thermogram.

6. A method as set forth in claim 5 wherein the scanning of said header and said nozzles includes moving said camera around the ring axis of said ring-shaped header.

* * * * *